United States Patent
Riedijk et al.

(10) Patent No.: US 9,971,926 B2
(45) Date of Patent: May 15, 2018

(54) FINGERPRINT SENSOR WITH CONTROLLABLE RESOLUTION

(71) Applicant: Fingerprint Cards AB, Göteborg (SE)

(72) Inventors: Frank Riedijk, Delft (NL); Hans Thörnblom, Kungsbacka (SE); Daniel Andersson, Göteborg (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days. days.

(21) Appl. No.: 15/484,554

(22) Filed: Apr. 11, 2017

(65) Prior Publication Data

US 2017/0344780 A1  Nov. 30, 2017

(30) Foreign Application Priority Data

May 30, 2016 (SE) .................................. 16507444

(51) Int. Cl.
*G06K 9/00* (2006.01)

(52) U.S. Cl.
CPC ....... *G06K 9/0002* (2013.01); *G06K 9/00053* (2013.01)

(58) Field of Classification Search
None
See application file for complete search history.

(56) References Cited

U.S. PATENT DOCUMENTS

| | | | |
|---|---|---|---|
| 6,636,053 B1 * | 10/2003 | Gozzini | G01D 5/24 324/658 |
| 2003/0099380 A1 | 5/2003 | Gozzini | |
| 2004/0251917 A1 | 12/2004 | Blanchard | |
| 2008/0069413 A1 * | 3/2008 | Riedijk | G06K 9/0002 382/124 |
| 2009/0067684 A1 | 3/2009 | Mainguet | |
| 2010/0156805 A1 | 6/2010 | Brand et al. | |

(Continued)

FOREIGN PATENT DOCUMENTS

WO   2005124659 A1   12/2005

OTHER PUBLICATIONS

Swedish Search Report for Swedish Application No. 1650744-4 dated Jan. 30, 2017, 3 pages.

*Primary Examiner* — Christopher R Lamb
(74) *Attorney, Agent, or Firm* — RMCK Law Group PLC

(57) ABSTRACT

There is provided a capacitive fingerprint sensing device for sensing a fingerprint pattern of a finger, the capacitive fingerprint sensor comprising: a protective dielectric top layer to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure, the readout circuitry comprising a plurality of signal amplifiers arranged underneath the array of electrically conductive sensing structures, wherein a number of signal amplifiers is lower than a number of sensing structures; and selection circuitry coupling each of the sensing structures to at least one signal amplifier and configured to select a sensing structure to be coupled to a corresponding signal amplifier. There is also provided a method for controlling a fingerprint sensing device.

6 Claims, 4 Drawing Sheets

(56) References Cited

U.S. PATENT DOCUMENTS

| | | | |
|---|---|---|---|
| 2014/0103941 A1* | 4/2014 | Chou | G06F 3/044 |
| | | | 324/658 |
| 2014/0241595 A1 | 8/2014 | Bernstein et al. | |
| 2014/0359756 A1 | 12/2014 | Alameh et al. | |
| 2016/0034740 A1 | 2/2016 | Wickboldt et al. | |
| 2016/0063301 A1* | 3/2016 | Wu | G06K 9/00033 |
| | | | 382/124 |

\* cited by examiner

FINGERPRINT SENSOR WITH CONTROLLABLE RESOLUTION

CROSS-REFERENCE TO RELATED APPLICATIONS

This application claims priority to Sweden Application No. 1650744-4, filed on May 30, 2016, the disclosure of which is incorporated herein by reference in its entirety.

FIELD

The present invention relates to a fingerprint sensor. In particular, the present invention relates to a capacitive fingerprint sensor having a controllable resolution.

BACKGROUND

Various types of biometric systems are used more and more in order to provide for increased security and/or enhanced user convenience.

In particular, fingerprint sensing systems have been adopted in, for example, consumer electronic devices, thanks to their small form factor, high performance, and user acceptance.

Among the various available fingerprint sensing principles (such as capacitive, optical, thermal etc), capacitive sensing is most commonly used, in particular in applications where size and power consumption are important issues.

All capacitive fingerprint sensors provide a measure indicative of the capacitance between each of several sensing structures and a finger placed on or moved across the surface of the fingerprint sensor.

With the increasing and more varied usage of fingerprint sensors come requirements for increased resolution of the fingerprint sensor. In some applications it may desirable to provide fingerprint sensors having a better image quality offering resolution higher than the standard 500 dpi. Image resolution and quality will have a positive effect on false rejection rate (FFR) and false acceptance rate (FAR) performance and could be used as input for fast finger detect. It could also enable smaller and thereby more economical area sensors.

However, some devices applications require high resolution and some do not, the required resolution may also differ between different use cases. Accordingly, it is desirable to provide a fingerprint sensor offering a high resolution but where the resolution can be controlled to accommodate different needs.

In general obtaining a controllable (flexible) resolution is not as straightforward as it may seem. The size of the sensing structures (pixels) and the local amplifiers are mostly fixed and a different resolution means a full redesign of the sensor which doesn't address the different needs for different markets and customers. Also, merely scaling up the resolution and measuring methods could end up in unrealistic component density in the imaging matrix, either leading to the need of smaller and more expensive process nodes or to lower yield.

Accordingly, there is a need for an improved fingerprint sensor which is usable in a wide range of applications.

SUMMARY

In view of above-mentioned and other drawbacks of the prior art, it is an object of the present invention to provide a capacitive fingerprint sensing device having a controllable resolution.

According to a first aspect of the invention, there is provided a capacitive fingerprint sensing device for sensing a fingerprint pattern of a finger, the capacitive fingerprint sensor comprising: a protective dielectric top layer to be touched by the finger; a two-dimensional array of electrically conductive sensing structures arranged underneath the top layer; readout circuitry coupled to each of the electrically conductive sensing structures to receive a sensing signal indicative of a distance between the finger and the sensing structure, the readout circuitry comprising a plurality of signal amplifiers arranged underneath the array of electrically conductive sensing structures, wherein a number of signal amplifiers is lower than a number of sensing structures; and selection circuitry coupling each of the sensing structures to at least one signal amplifier and configured to select a sensing structure to be coupled to a corresponding signal amplifier.

The electrically conductive sensing structure may advantageously be provided in the form of a metal plate, so that a parallel plate capacitor is formed by the sensing structure, the local finger surface, and the protective coating therebetween (and any air that may locally exist between the finger surface and the protective coating).

The protective coating in the form of a dielectric top layer may advantageously be at least 20 µm thick and have a high dielectric strength to protect the underlying structures of the fingerprint sensing device from wear and tear as well as from electrostatic discharge (ESD). Even more advantageously, the protective coating may be at least 50 µm thick. In some embodiments, the protective coating may be a few hundred micrometers thick.

In the present context, that the electrically conductive sensing structures are arranged in a two dimensional array should be interpreted to mean that the array extends in two directions, i.e. that it extends in an xy-plane with a plurality of sensing elements in both the x- and y-direction. The fingerprint sensing device is thus to be seen as an area sensor, as opposed to a line sensor. Furthermore, an array should be interpreted as a systematic arrangement of similar objects, here the sensing structures. The sensing structures are thus arranged in a regular pattern. As a whole, the array may have an outline which is regular, such as square or rectangular outline. However, the array may equally well have a circular, freeform or irregular outline.

The readout circuitry is arranged to receive the sensing signal from each active sensing structure and to combine the plurality of sensing signals to form a fingerprint image.

The selection circuitry couples the sensing structures to at least one signal amplifier, meaning that a signal representative of the capacitive coupling between a sensing structure and a finger placed on the sensing surface is provided to a signal amplifier. The signal representative of the capacitive coupling is in turn indicative of the distance between the sensing structure and the finger, such that ridges and valleys of the fingerprint can be distinguished. An output signal from the signal amplifier may in turn be provided to further processing circuitry such as an AD converter.

A signal amplifier is configured to amplify a charge, current or a voltage sensing signal indicative of a distance between the finger and the sensing structure such that the amplified signal is suitable for use in the following readout circuitry, for example as an input signal to an AD converter.

The present invention is based on the realization that a fingerprint sensing device having a controllable resolution can be achieved by arranging a plurality of signal amplifiers underneath the sensing structures, where the number of signal amplifiers is lower than the number of sensing structures. This allows the size of the sensing structures, i.e. the pixel size, to be reduced without having to reduce the size of the signal amplifiers coupled to the sensing structures. In previous fingerprint sensing devices, each sensing structure has typically been connected to a corresponding signal amplifier with a 1:1 ratio. To increase the resolution in such a design, the size of the signal amplifier has to be scaled down along with the pixel size. By instead using selection circuitry, the size of the sensing structure can be selected independently of the size of the signal amplifier, where selection circuitry is used to couple the required number of sensing structures to a signal amplifier such that all sensing structures can be read. By decoupling the resolution of the sensing structures from the resolution of the signal amplifiers, a higher resolution can be achieved with maintained or improved yield, since the sensing structures in the form of conductive plates can more easily be reduced in size as compared to the signal amplifiers.

Moreover, depending on how the selection circuitry is configured, it is also possible to achieve different resolution for different applications and use cases by selecting the sensing structures to activate during a fingerprint capture. Since the number of signal amplifiers is lower than the number of sensing structures, a fingerprint capture having the highest possible resolution will have to be performed at least in part sequentially, in which case different sensing structures are read at different points in time.

Furthermore, by means of the controllable resolution, the same type of sensor can be used in a wide range of devices with different resolution requirements. This enables large scale production of the fingerprint sensing device where larger series in turn leads to a lower manufacturing cost and a higher process yield.

According to one embodiment of the invention, the signal amplifiers may be arranged in an array having a lower resolution than a resolution of the array of sensing structures. Accordingly, the signal amplifiers may be arranged in an array, which in one embodiment of the invention may be of the same configuration as the sensing circuit array but with a lower resolution. For example, there may be one signal amplifier for every m×n sensing structures, where m, n>1, and where m may be equal to or different from n, arranged in the same configuration, i.e. "pattern", as the sensing structures. A shared configuration of the sensing structure array and the signal amplifier array also enables a straightforward configuration of the selection circuitry.

According to one embodiment of the invention, the selection circuitry may be configured to couple at least two adjacent sensing structures to one signal amplifier. By coupling two, or more, adjacent sensing structures to one and the same signal amplifier, the respective sensing structures can be coupled to the signal amplifier either sequentially or in parallelly.

In one embodiment of the invention, the selection circuitry may be configured to couple a subarray of sensing structures to one signal amplifier. Connecting the sensing structures sequentially to the signal amplifier enables stepping through the subarray of sensing structures during readout. Moreover, by simultaneously connecting adjacent sensing structures to one signal amplifier, i.e. performing parallel readout, a summation of the contributions form the respective sensing structures is performed and the effective pixel size is increased, i.e. the resolution is decreased. Connecting a plurality of adjacent sensing structures to one signal amplifier, via the selection circuitry, thereby enables a controllable resolution.

According to one embodiment of the invention, the selection circuitry may comprise a plurality of multiplexers coupling at least two of the sensing structures to a signal amplifier. The use of multiplexers to couple two or more sensing structures to a signal amplifier may simplify the control of the selection circuitry. In particular, if a large number of sensing structures is to be coupled to each signal amplifier, multiplexers are advantageous since they are readily scalable to handle a large number of inputs.

According to one embodiment of the invention, the selection circuitry may comprise one controllable switch connected to each sensing structure for selectively coupling each sensing structure to a signal amplifier, thereby providing a straightforward solution for selectively connecting the selected sensing structures to corresponding signal amplifiers.

In one embodiment of the invention, a sensing structure may be connected to at least two signal amplifiers via the selection circuitry. By connecting a sensing structure to more than one signal amplifier, the pattern of sensing structures that can be read simultaneously is more flexible. In particular, taking the example of a subarray of sensing structures, where each sensing structure of the subarray is connected to one and the same signal amplifier, the sensing structures within the subarray will have to be read sequentially to achieve the highest possible resolution, i.e. using the smallest possible pixel size. By connecting one or more of the sensing structures within the subarray to a second signal amplifier, a number of sensing structures within the subarray can be read simultaneously, thereby increasing readout speed.

According to one embodiment of the invention, the fingerprint sensing device may further comprise a plurality of sensing plates arranged underneath the sensing structures and between the sensing structures and the signal amplifiers such that each sensing structure is capacitively coupled to an underlying sensing plate, each of the sensing structures being individually connectable to ground via the selection circuitry and each of the sensing plates being connected to at least one signal amplifier. The sensing structure is capacitively coupled to the sensing plate by means of a dielectric material arranged therebetween. When the sensing structure is not grounded, it is electrically floating such that it adjusts to the electric field between the finger and the sensing plate. Thereby, for an electrically floating sensing structure there is a capacitive coupling between the finger and the sensing plate such that a charge is induced in the sensing plate, whereas for a grounded sensing structure, there is a capacitive coupling between the finger and the sensing structure. Accordingly, a grounded sensing plate acts as an electromagnetic shielding structure by blocking the electromagnetic field and preventing the capacitive coupling between a finger and an underlying sensing plate. This enables control of the effective resolution of the sensing device by controlling which of the sensing structures are grounded during readout of the corresponding sensing plates.

That the sensing structures are coupled to the signal amplifiers can thus mean that the sensing structures are electrically connected to the signal amplifier directly via the selection circuitry, or that the sensing structure is capacitively coupled to an underlying sensing plate which in turn is electrically connected to a corresponding signal amplifier. In both cases, a signal representative of the distance between a finger and the underlying sensing structures is provided to the signal amplifier, such that a fingerprint image can be acquired. The selection circuitry can thus be arranged in a number of different ways as will be discussed in further detail in the following detailed description.

According to one embodiment of the invention, the sensing plates may be arranged in an array having a lower resolution than a resolution of the array of sensing structures. A sensing plate may for example be larger than the size of a sensing structure such that two or more sensing structures are arranged above the sensing plate. A sensing structure connected to ground will thus act as a shield shielding the part of the sensing plate which is directly below the grounded sensing structure. Correspondingly, if one or more sensing structures arranged above a particular sensing plate is ungrounded, the charge on the sensing plate will represent the charge resulting from the finger located above all of the ungrounded sensing structures, thereby in effect summing the contributions from the sensing structures on the sensing plate, which in turn provides the summed contribution to a signal amplifier. Accordingly, by selecting which sensing structures are grounded and which are ungrounded during readout of the sensing plate, the effective resolution of the sensing device can be controlled.

According to one embodiment of the invention, the selection circuitry may further comprise sensing plate selection circuitry connecting each sensing plate to at least two signal amplifiers. The fingerprint sensing device may thus be provided with selection circuitry acting on different levels in the device, where a first level of selection circuitry controls which of the sensing structures are coupled to a sensing plate, and a second level of selection circuitry, sensing plate selection circuitry, controls which sensing plate is coupled to a particular signal amplifier. By means of the different levels of selection circuitry, it is possible to control the resolution of the fingerprint sensor as well as the specific configuration of an active pixel to a higher degree.

According to one embodiment of the invention, the selection circuitry and the plate selection circuitry may advantageously be configured such that a first sensing structure located above a first sensing plate and a second sensing structure located above a second sensing plate can be simultaneously connected to the same signal amplifier, which allows two sensing structures to be connected to the same signal amplifier even though they are not located above the same sensing plate. This in turn provides a greater flexibility when selecting the resolution and effective pixel configuration. In practice, this can be achieved by using multiplexing circuitry.

In one embodiment of the invention, the first sensing plate is arranged adjacent to the second sensing plate, such that two adjacent sensing structures located above different but adjacent sensing plates can be simultaneously coupled to one and the same signal amplifier.

According to one embodiment of the invention, the sensing plate selection circuitry may advantageously comprise a plurality of multiplexers connecting at least two sensing plates to one signal amplifier.

According a second aspect of the invention, there is provided a method for controlling a capacitive fingerprint sensing device comprising: a protective dielectric top layer to be touched by said finger; a two-dimensional array of electrically conductive sensing structures arranged underneath said top layer; readout circuitry coupled to each of said electrically conductive sensing structures to receive a sensing signal indicative of a distance between said finger and said sensing structure, said readout circuitry comprising a plurality of signal amplifiers arranged underneath said array of electrically conductive sensing structures, wherein a number of signal amplifiers is lower than a number of sensing structures; and selection circuitry coupling each of said sensing structures to at least one signal amplifier and configured to select a sensing structure to be coupled to a corresponding signal amplifier; the method comprising: during readout, controlling said selection circuitry to connect each sensing structure to a corresponding signal amplifier; and controlling said readout circuitry to form a fingerprint image.

According to one embodiment of the invention, the method comprises, in a sensing device where said signal amplifiers are arranged in an array having a lower resolution than a resolution of said array of sensing structures: controlling said selection circuitry to connect one or more sensing structures to corresponding signal amplifiers such that a desired resolution of a resulting fingerprint image is achieved. Moreover, the selection circuitry can be controlled, along with the readout circuitry to perform partially parallel readout where sensing structures coupled to different signal amplifiers can be read out in parallel whereas a subgroup of sensing structures connected to one and the same signal amplifier is read out in sequentially. This in turn provides to possibility to increase the readout speed, and to control the readout speed as a function of the selected resolution.

Additional effects and features of the second aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein.

DETAILED DESCRIPTION

In the present detailed description, various embodiments of the fingerprint sensing device according to the present invention are mainly described with reference to a capacitive fingerprint sensing device comprised in a mobile phone.

Figure 1:
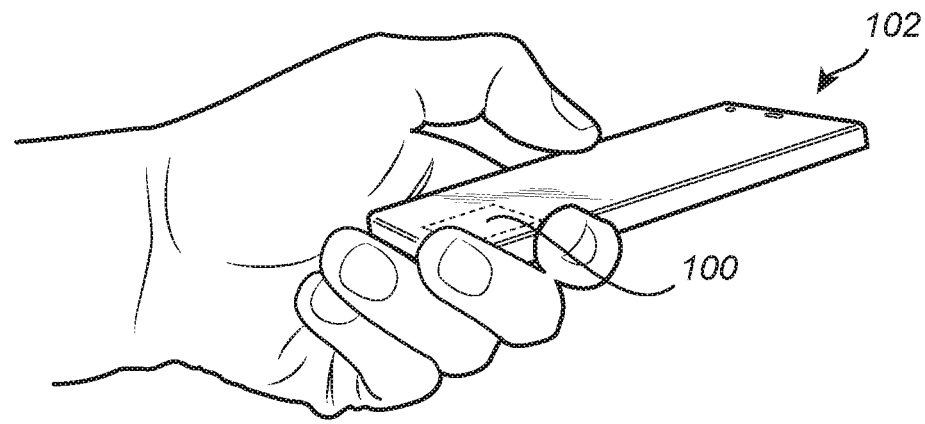
FIG. 1 schematically illustrates a mobile phone comprising a fingerprint sensing device.

FIG. 1 schematically illustrates an application for a fingerprint sensing device 100 according to an example embodiment of the present invention, in the form of a mobile phone 102 with an integrated fingerprint sensing device 100. The fingerprint sensing device 100 may, for example, be used for unlocking the mobile phone 102 and/or for authorizing transactions carried out using the mobile phone, etc. A fingerprint sensing device according to various embodiments of the invention may also be used in other devices, such as tablet computers, laptops, smart cards or other types of consumer electronics.

Figure 2:
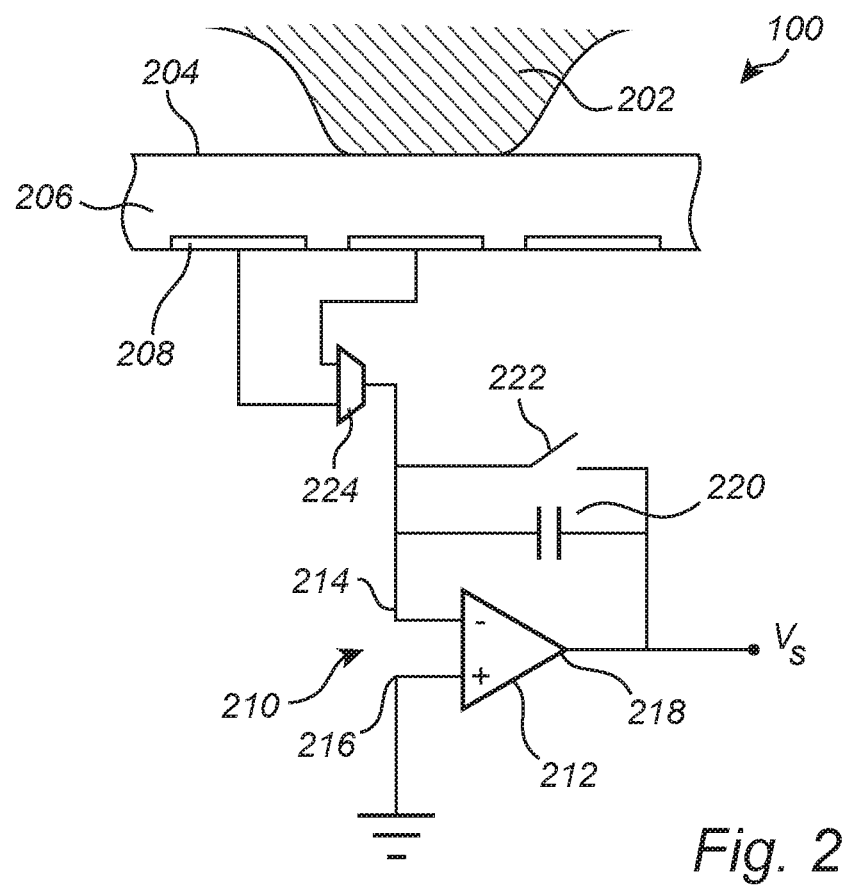
FIG. 2 is a schematic circuit diagram of a part of the fingerprint sensing device according to an embodiment of the invention.

FIG. 2 is a schematic cross section and a circuit schematic of a portion of a fingerprint sensing device 100 according to an embodiment of the invention, with a finger 202 placed on a sensing surface 204 of the sensing device 100. The fingerprint sensing device comprises a plurality of sensing elements, each comprising a protective dielectric top layer 206, an electrically conductive sensing structure 208, here in the form of a metal plate 208 located underneath the protective dielectric top layer 206, and a signal amplifier here illustrated by a charge amplifier 210. The sensing structures 208 are typically arranged in an array to form a sensing array, where each sensing structure 208 can be considered to represent a pixel.

The charge amplifier 210 comprises at least one amplifier stage, here schematically illustrated as an operational amplifier (op amp) 212 having a first input (negative input) 214 connected to the sensing structure 208, a second input (positive input) 216 connected to ground (or to another reference potential), and an output 218. In addition, the charge amplifier 210 comprises a feedback capacitor 220 connected between the first input 214 and the output 218, and reset circuitry, here functionally illustrated as a switch 222, for allowing controllable discharge of the feedback capacitor 220. The charge amplifier 210 may be reset by operating the reset circuitry 222 to discharge the feedback capacitor 220.

As is often the case for an op amp 212 in a negative feedback configuration, the voltage at the first input 214 follows the voltage at the second input 216. Depending on the particular amplifier configuration, the potential at the first input 214 may be substantially the same as the potential at the second input 216, or there may be a substantially fixed offset between the potential at the first input 214 and the potential at the second input 216. In the configuration of FIG. 2, the first input 214 of the charge amplifier is virtually grounded.

When a finger is placed on the sensing surface, a potential difference is induced between the sensing structure 208 and the finger 202. The potential difference is induced by a drive signal which for example may be provided to the finger by means of a bezel. The drive signal may also be connected to the ground plane of the sensor, or the sensing device may be configured such that the reference potential of the entire sensing device is changed by the drive signal, thereby inducing the potential difference. Accordingly, the potential difference may be induced in any number of ways known to the skilled person. The induced change in potential difference between the finger 202 and the reference sensing structure 208 in turn results in a sensing voltage signal Vs on the output 218 of the charge amplifier 210, where the amplitude of the voltage is a function of the capacitive coupling between the finger 202 and the sensing structure 208, and thereby indicative of the distance between the finger 202 and the sensing structure 208. The sensing voltage signal Vs is in turn provided to readout circuitry where sensing voltage signals from the array of sensing elements together form a fingerprint image.

FIG. 2 further illustrate selection circuitry 224 coupling two separate adjacent sensing structures 208 to one charge amplifier 210. The selection circuitry 224 is configured to select a sensing structure to be connected to a corresponding signal amplifier 210 during readout. The selection circuitry 224 may for example comprise a multiplexer or equivalent multiplexing circuitry.

Figure 3:
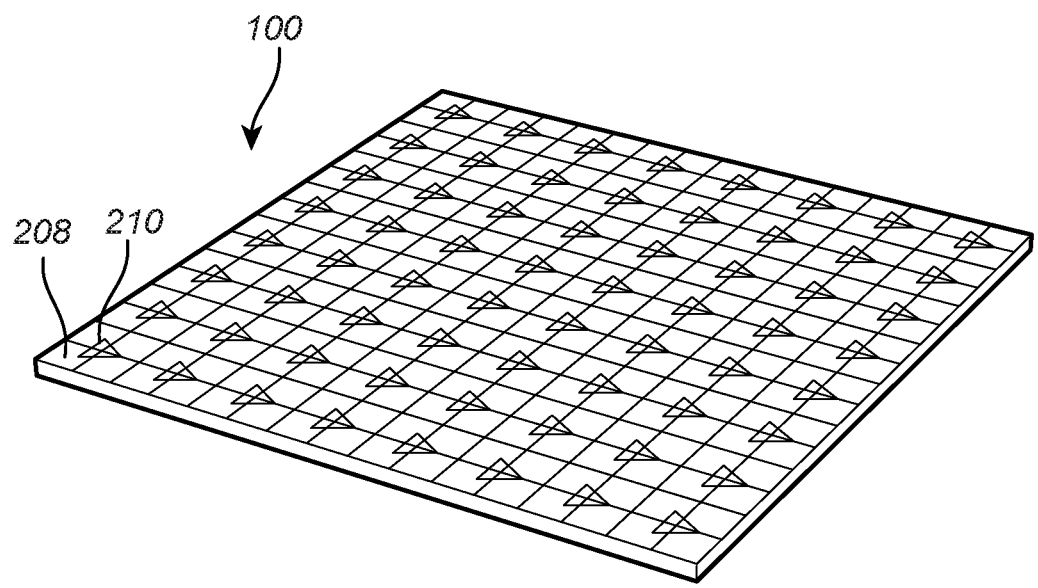
FIG. 3 schematically illustrates a portion of a fingerprint sensing device according to an embodiment of the invention.

FIG. 3 is a schematic illustration of a fingerprint sensing device 100 comprising an array of sensing structures 208 and an array of signal amplifiers 210 arranged underneath the array of sensing structures 208. Here, it is assumed that each signal amplifier 210 is connected to four distinct sensing structures 208 by means of selection circuitry, and the illustrated array of charge amplifiers 210 accordingly has a resolution which is ¼ of the resolution of the sensing array. Moreover, both the sensing array and the array of signal amplifiers have the same configuration, i.e. pattern, here a square array. In other words, each signal amplifier 210 is coupled to each sensing structure 208 in a subarray of sensing structures, here illustrated as a 2×2 subarray. However, it should be noted that any feasible n×m array of sensing structures could be connected to one signal amplifier.

Figure 4A:
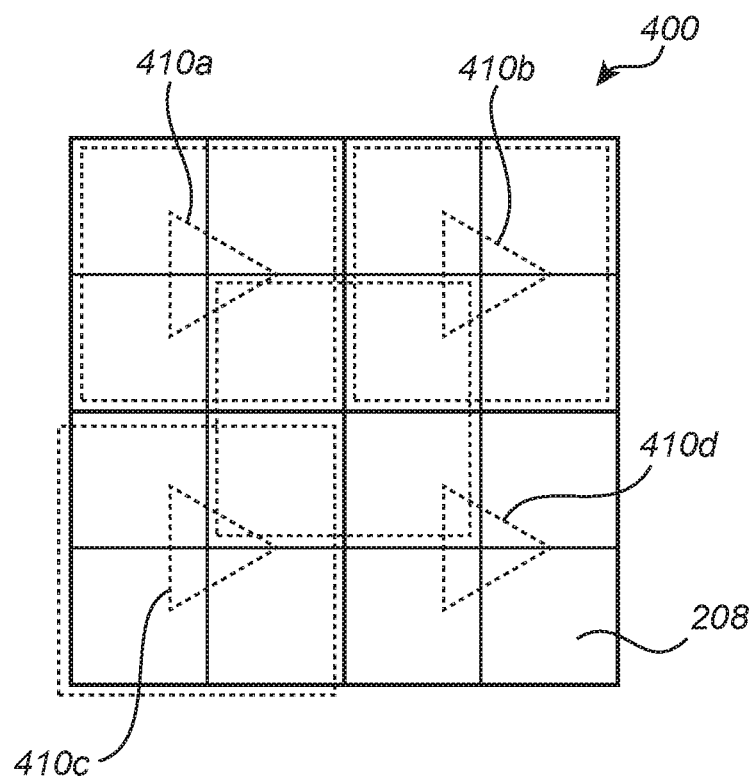
FIG. 4A schematically illustrates a portion of a fingerprint sensing device according to an embodiment of the invention.

FIG. 4A schematically illustrates 16 sensing structures 208 arranged in a 4×4 array 400, forming a part of a fingerprint sensing device. Underneath the array 400 of sensing structures 208, a 2×2 array of signal amplifiers 410a-d is illustrated.

Figure 4B:
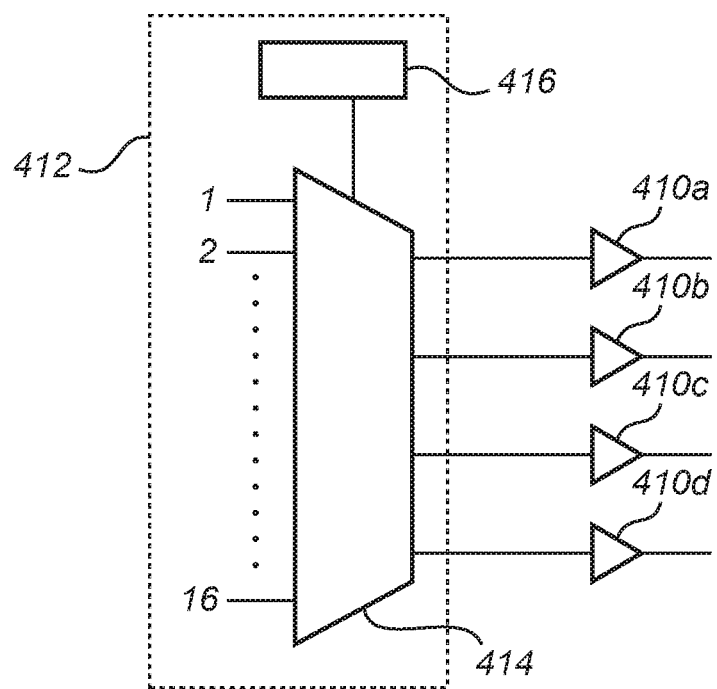
FIG. 4B schematically illustrates selection circuitry for a fingerprint sensing device according to an embodiment of the invention.

FIG. 4B schematically illustrates selection circuitry 412 comprising a multiplexer 414 and multiplexer control circuitry 416 configured to connect any four of the sensing structures 208 to a corresponding one of the signal amplifiers 410a-d. The multiplexer is illustrated showing 16 inputs, corresponding to the 4×4 array of sensing structures 208 in FIG. 4A. The described control circuitry 412 makes it possible to select four sensing structures being read simultaneously, as exemplified by the dashed squares in FIG. 4A, thereby providing the possibility to sweep the readout of the sensing array and to select the effective resolution of the sensing array. The skilled person realizes that more complex multiplexing circuitry may be used to increase the number of possible readout combinations. Moreover, the multiplexing circuitry may be embodied in many different ways.

The selection circuitry and associated readout circuitry may also be configured to allow both sequential and parallel readout of the sensing structures 208.

Figure 5:
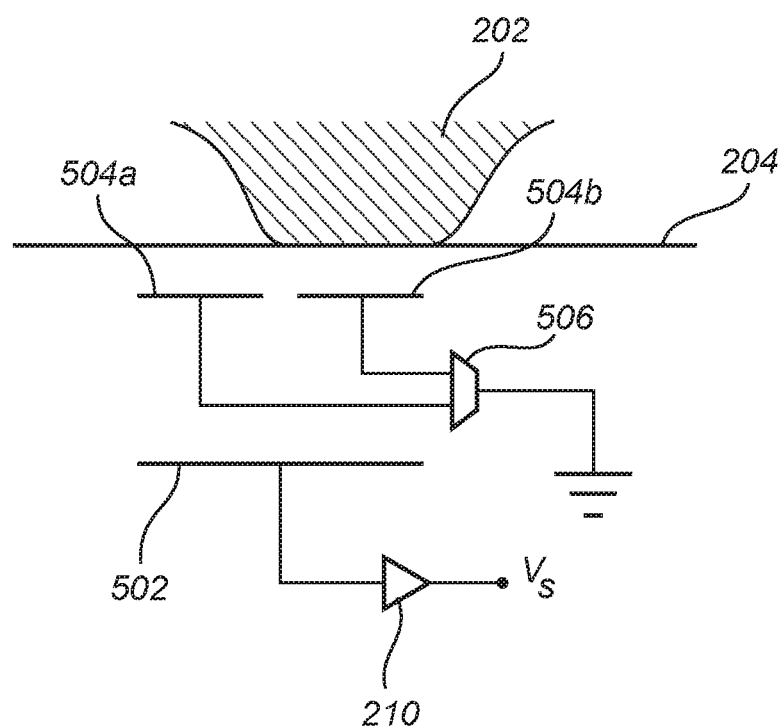
FIG. 5 schematically illustrates a portion of a fingerprint sensing device according to an embodiment of the invention.

FIG. 5 schematically illustrates a portion of a fingerprint sensing device where a sensing plate 502 is arranged underneath the sensing structures 504a-b and between the sensing structures 504a-b and a signal amplifier 210, such that each sensing structure 504a-b is can be capacitively coupled to an underlying sensing plate 502. Each of the sensing structures 504a-b is individually connectable to ground via selection circuitry 506.

When a sensing structure 504a-b is connected to ground via the selection circuitry 506, here illustrated as a demultiplexer, it will shield the part of the sensing plate 502 which is directly below the grounded sensing structure 504a-b. Correspondingly, if one or more of the sensing structures 504a-b arranged above a particular sensing plate 502 is ungrounded, i.e. floating, the charge on the sensing plate 502 will represent the combined charge of the ungrounded sensing structures 504a-b, thereby in effect summing the contributions from the sensing structures 504a-b on the sensing plate 502, which in turn provides the summed contribution to a signal amplifier 210. Accordingly, by selecting which sensing structures are grounded and which are ungrounded during readout of the sensing plate, the effective resolution of the sensing device can be controlled.

Figure 6:
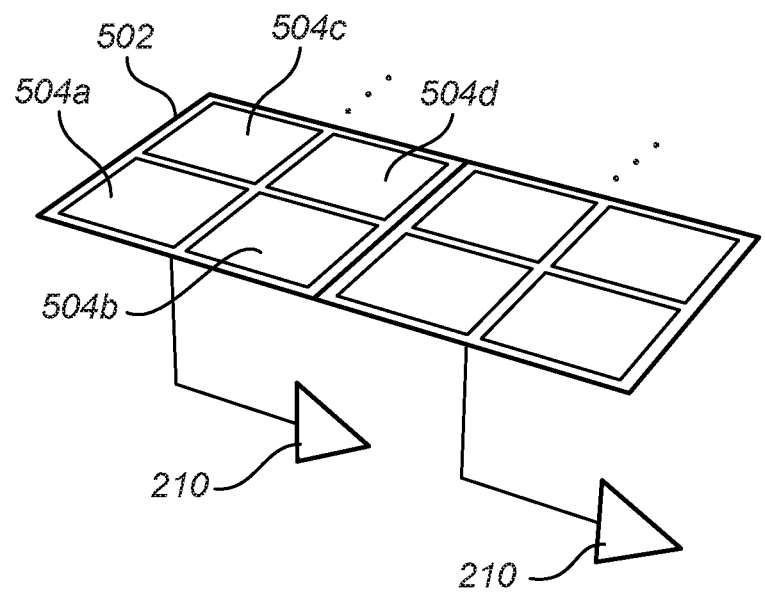
FIG. 6 schematically illustrates a portion of a fingerprint sensing device according to an embodiment of the invention.

FIG. 6 schematically illustrates a sensing plate 502 arranged underneath four sensing structures 504a-d, where each sensing structure is controllably coupled to ground via selection circuitry (not shown) and where the sensing plate 502 is connected to a respective signal amplifier 210.

In the same manner as described in relation to FIG. 4B, the selection circuitry 506 controlling the grounding of the sensing structures 504-a-d can also be configured to allow a variable resolution and sweeping a readout window.

Figure 7:
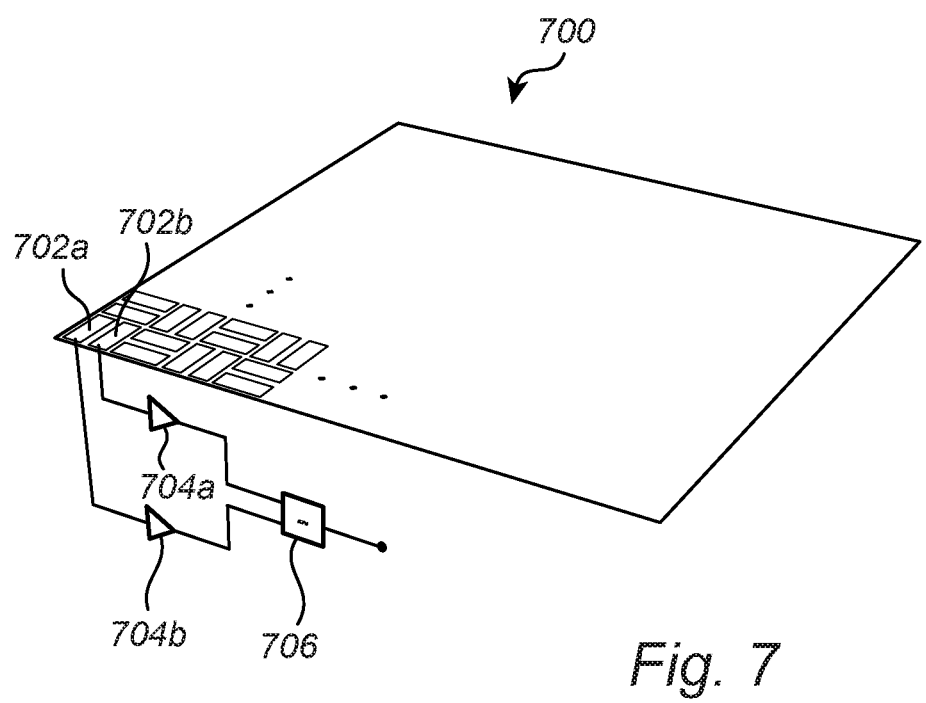
FIG. 7 is a schematic illustration of a fingerprint sensing device according to an embodiment of the invention.

FIG. 7 schematically illustrates an embodiment of a sensing device 700 comprising a plurality of pairwise arranged sensing structures 702a-b having a rectangular shape. In some applications it is desirable to arrange the sensing device under thick cover layers, such as under a display glass in a smartphone and similar electronic devices. An increased thickness of the cover layer also means a reduced strength of the readout signal, which in turn may make it difficult to acquire fingerprint images of sufficient quality. One way of addressing the issue with decreased signal strength is to perform differential readout where the difference between adjacent sensing structures is determined. The sensing device 700 illustrated in FIG. 7 may advantageously be used for differential readout, as illustrated by the two signal amplifiers 704a-b connected to the respective sensing structures 702a-b. The difference between the signals from the two signal amplifiers 704a-b is provided by a subtractor 706, which may be embodied in different ways known by the skilled person.

It should be understood that the sensing structure configuration illustrated in FIG. 7 advantageously may be combined with any of the above described embodiments describing selection circuitry for achieving a controllable resolution of the fingerprint sensing device.

Even though the invention has been described with reference to specific exemplifying embodiments thereof, many different alterations, modifications and the like will become apparent for those skilled in the art. Also, it should be noted that parts of the fingerprint sensing device may be omitted, interchanged or arranged in various ways, the fingerprint sensing device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A capacitive fingerprint sensing device for sensing a fingerprint pattern of a finger, said capacitive fingerprint sensor comprising:
a protective dielectric top layer to be touched by said finger;
a two-dimensional array of electrically conductive sensing structures arranged underneath said top layer;
readout circuitry comprising a plurality of signal amplifiers arranged underneath said array of electrically conductive sensing structures, wherein a number of signal amplifiers is lower than a number of sensing structures;
selection circuitry coupling each of said sensing structures to ground and configured to select a sensing structure to be coupled to ground; and
a plurality of sensing plates arranged underneath said sensing structures and between said sensing structures and said signal amplifiers such that each sensing structure is capacitively coupled to an underlying sensing plate, each of said sensing structures being individually connectable to ground via said selection circuitry such that a particular sensing structure that is coupled to ground acts as a shielding structure preventing a capacitive coupling between said finger and a corresponding underlying sensing plate, each of said sensing plates being connected to an input of at least one signal amplifier, and
wherein said readout circuitry is capacitively coupled to each of said electrically conductive sensing structures via a capacitive coupling between sensing structures not connected to ground and underlying sensing plates to receive a sensing signal indicative of a distance between said finger and said sensing structure.

2. The fingerprint sensing device according to claim 1, wherein said plurality of sensing plates are arranged in an array having a lower resolution than a resolution of said array of sensing structures.

3. The fingerprint sensing device according to claim 1, wherein the selection circuitry further comprises sensing plate selection circuitry connecting each sensing plate to at least two signal amplifiers.

4. The fingerprint sensing device according to claim 3, wherein said selection circuitry and said sensing plate selection circuitry is configured such that a first sensing structure located above a first sensing plate and a second sensing structure located above a second sensing plate can be simultaneously coupled to the same signal amplifier via said first and second sensing plate.

5. The fingerprint sensing device according to claim 4, wherein said first sensing plate is arranged adjacent to said second sensing plate.

6. The fingerprint sensing device according to claim 3, wherein said sensing plate selection circuitry comprises a plurality of multiplexers connecting at least two sensing plates to one signal amplifier.

* * * * *